(No Model.)
C. A. HUSSEY.
ELECTRIC BATTERY.
No. 406,168. Patented July 2, 1889.
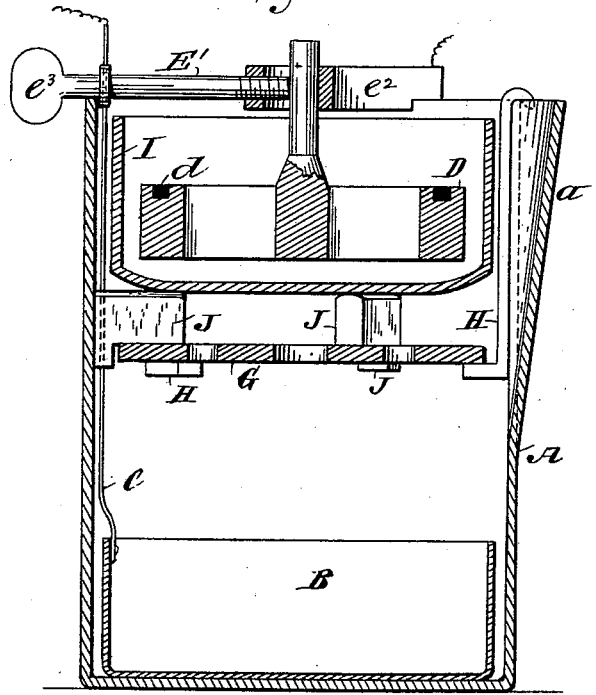
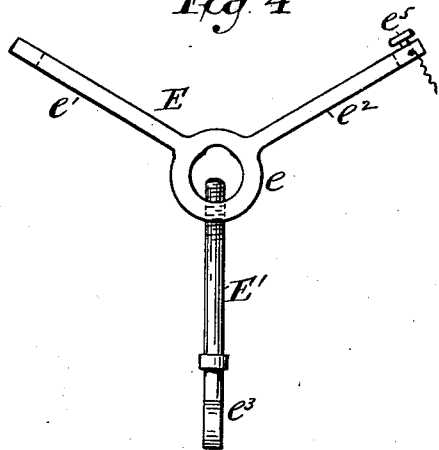
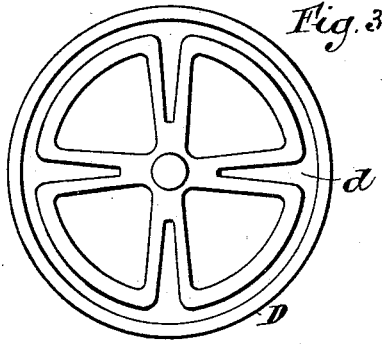
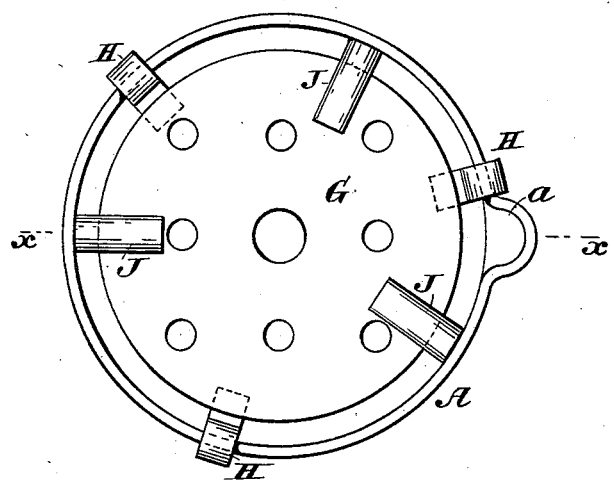
Witnesses
S. V. Edmonds
Geo Wadman
Inventor
Charles A. Hussey.
By his attorneys
Gifford & Brown

UNITED STATES PATENT OFFICE.

CHARLES A. HUSSEY, OF NEW YORK, N. Y.

ELECTRIC BATTERY.

SPECIFICATION forming part of Letters Patent No. 406,168, dated July 2, 1889.

Application filed November 17, 1888. Serial No. 291,143. (No model.)

*To all whom it may concern:*

Be it known that I, CHARLES A. HUSSEY, of New York, in the county and State of New York, have invented a certain new and useful Improvement in Electric Batteries, of which the following is a specification.

I will describe an electric battery embodying my improvement, and then point out the novel features in claims.

In the accompanying drawings, Figure 1 is a vertical section of a battery embodying my improvement, the section being taken as indicated by the dotted line $x\ x$, Fig. 2. Fig. 2 is a plan or top view, certain parts being removed. Fig. 3 is a plan or top view of one of the elements of the battery. Fig. 4 is a plan or top view of a frame and clamp comprised in the battery.

Similar letters of reference designate corresponding parts in all the figures.

A designates a cell, which may be of any suitable material. Glass may be the material employed, if desired. I have shown this cell as of cylindric form; but the shape is not important. At one side it has a lip $a$ formed in it.

B designates the negative element of the battery. It may be of any suitable material and shape. Ordinarily I prefer to make it of copper and in the form of a cup, as shown. It has secured to it one of the wire electrodes C of the battery. This wire may be connected by a coupling-piece, in any suitable manner, with another wire to form an electric circuit.

I have shown the element B as being supported by resting upon the bottom of the cell A.

D designates the positive element of the battery. It may be of any suitable material and shape. Ordinarily I prefer to make it of zinc and in the form of a spoked wheel, as shown. This positive element is in the present instance suspended from the top of the cell A by means of a frame E and screw E'. The frame E is shown as consisting of a ring $e$ and two diverging arms $e'\ e^2$. The screw E' enters a tapped hole in the ring $e$ of the frame E, and extends through into the interior of the ring. A hand-piece $e^3$ affords facility for turning the screw.

The frame E and screw E' rest upon the top of the cell A. To keep them in place, I have shown the arms of the frame E as notched on the under side near the outer end, and the screw E' as provided with a collar. The shoulders formed at the ends in the bottoms of the frame and the collar on the screw bear against the inner surface of the cell A, as will be seen by reference to Fig. 1. One of the arms of the frame is shown as provided with a hole into which a wire may be inserted. A screw $e^5$, fitted in a tapped hole in the arm, serves to clamp the wire in the hole within the arm.

I have shown the positive element D as provided with an axially-arranged shank. This extends up into the ring $e$ of the frame E, and is secured there by means of the screw E', as the latter serves to clamp it within the ring.

Any suitable solution may be employed in this battery. Ordinarily I prefer to use a solution of a salt of copper—as, for example, a sulphate-of-copper solution.

G designates a piece which I use in connection with a solution of a salt of copper. This piece should conform approximately to the interior of the cell A, and for this reason I have in the present instance shown it as in the form of a circular plate. It is considerably smaller than the interior of the cell, and is also provided with perforations, wherefore it does not prevent the circulation of fluid in the cell.

The piece G is to be made of a metal which will decompose the solution of salt of copper. Ordinarily I shall make it of iron. I can of course use steel, if preferred for any reason. This plate may be cast in the desired shape.

I have shown the piece G as suspended from the top of the cell A by means of hangers H, having hooked upper ends engaging with the top edge of the cell A, and inwardly-turned lower ends upon which the piece G rests. There may be any number of these hangers. Any other means of supporting the piece G may be employed in lieu thereof.

I designates a porous diaphragm. (Here shown as made in the form of a cup.) It may be of any material ordinarily employed for the purpose—as, for instance, kaolin. It is preferably made of a shape to conform to the interior of the cell A, and in the present instance is therefore cylindrical. It is shown as supported by resting upon blocks J. These blocks may be of any desirable number. They are shown as resting upon the piece G and as having the cup I resting upon their upper surfaces. They have downward extensions at the outer ends, so as to fit between the piece G and the interior of the cell A. Owing to this they will be kept in position, and they will also keep the piece G in its proper place centrally within the cell A.

The hangers H and blocks J may be of any suitable material. Preferably wood or hard rubber may be employed.

The positive element D is provided with a receptacle for quicksilver. This receptacle, as here shown, consists of a groove $d$, formed in the upper surface. Quicksilver placed in the receptacle will render the positive element, when made of zinc, self-amalgamating.

The feature of my improvement, which consists in providing a positive zinc element with a receptacle for quicksilver, is applicable to any battery where the zinc element is used.

It will of course be understood that any suitable solution may be used in contact with the positive element.

The interposition between the two elements of a piece of metal which will decompose a solution of a salt of copper is very advantageous. The salt-of-copper solution on reaching this piece of metal will be decomposed. Owing to this the zinc plate will be protected from any contact of such solution with it. The zinc plate will be insured against being coated or plated with copper, the battery being thus adapted for open-circuit as well as closed-circuit work.

What I claim as my invention, and desire to secure by Letters Patent, is—

1. In an electric battery employing a solution of a salt of copper, the combination, with a cell and positive and negative elements, of a porous diaphragm arranged in the upper part of the cell below the positive element, and a piece of metal which is arranged below the porous diaphragm and will decompose the salt-of-copper solution, substantially as specified.

2. In an electric battery employing a solution of a salt of copper, the combination, with a cell and positive and negative elements, of a porous diaphragm arranged in the upper part of the cell below the positive element, and a piece of iron or steel arranged between the porous diaphragm and the negative element, substantially as specified.

3. In an electric battery employing a solution of a salt of copper, the combination, with positive and negative elements, of a piece of iron or steel interposed between the said elements, substantially as specified.

C. A. HUSSEY.

Witnesses:
S. O. EDMONDS,
GEO. WADMAN.